United States Patent
Graham et al.

[11] Patent Number: 6,112,868
[45] Date of Patent: Sep. 5, 2000

[54] EXTERNALLY ADJUSTABLE DAMPENING CONTROL FOR A SHOCK ABSORBER

[75] Inventors: Scott Graham, Columbia; Srinath Nandyal, Pulaski, both of Tenn.

[73] Assignee: Gabriel Ride Control Products, Inc., Brentwood, Tenn.

[21] Appl. No.: 08/974,367

[22] Filed: Nov. 19, 1997

Related U.S. Application Data

[63] Continuation of application No. 08/746,760, Nov. 15, 1996, abandoned, which is a continuation of application No. 08/332,943, Oct. 31, 1994, abandoned.

[51] Int. Cl.⁷ ........................................................ F16F 9/00
[52] U.S. Cl. .................... 188/318; 188/322.2; 188/319.2
[58] Field of Search ................ 188/299.1, 309, 188/313, 318, 319.2, 322.2, 322.13

[56] References Cited

U.S. PATENT DOCUMENTS

| | | | |
|---|---|---|---|
| 1,560,477 | 11/1925 | Kessler | 188/318 |
| 3,107,753 | 10/1963 | Georgette | 188/313 |
| 4,310,077 | 1/1982 | Whiteside | 188/315 |
| 5,392,885 | 2/1995 | Patzenhauer et al. | 188/322.13 |
| 5,533,596 | 7/1996 | Patzenhauer et al. | 188/318 |

FOREIGN PATENT DOCUMENTS 2262971  7/1993  United Kingdom.

*Primary Examiner*—Robert J. Oberleitner
*Assistant Examiner*—Mariano Sy
*Attorney, Agent, or Firm*—McAndrews, Held & Malloy, Ltd.

[57] ABSTRACT

An externally adjustable dampening control for a shock absorber provides the ability to adjust the hardness and softness of the ride near the normal curb/ride height, and still give strong resistance, and hence control, when the piston moves beyond the intermediate region. The adjustable dampening control includes a bypass for permitting fluid to bypass the piston when the piston is within an intermediate region of the cylinder corresponding to the normal curb/ride height of the shock. The bypass includes a valve body extending longitudinally along a portion of the hollow cylinder and defining a flow passage having first and second longitudinally spaced ports opening to cylinder and defining a flow passage having first and second longitudinally spaced ports opening to the internal chamber. Resistance to piston movement can be adjusted by rotating a knob to move a second piston into and out of the flow passage, thereby adjusting the amount of fluid that can flow through the bypass flow passage.

11 Claims, 5 Drawing Sheets

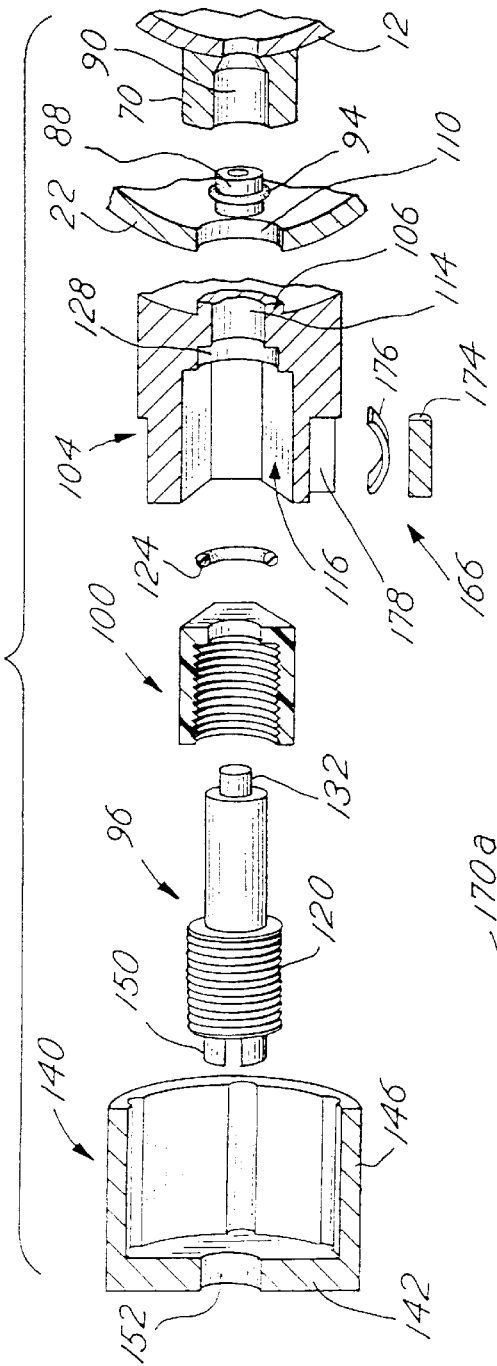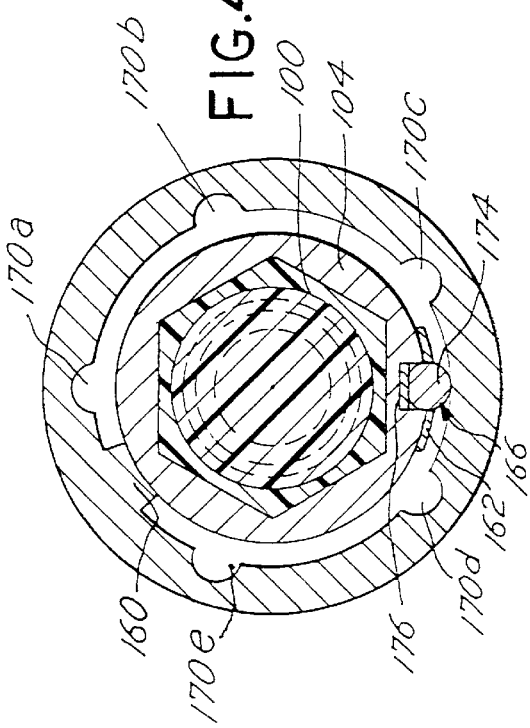

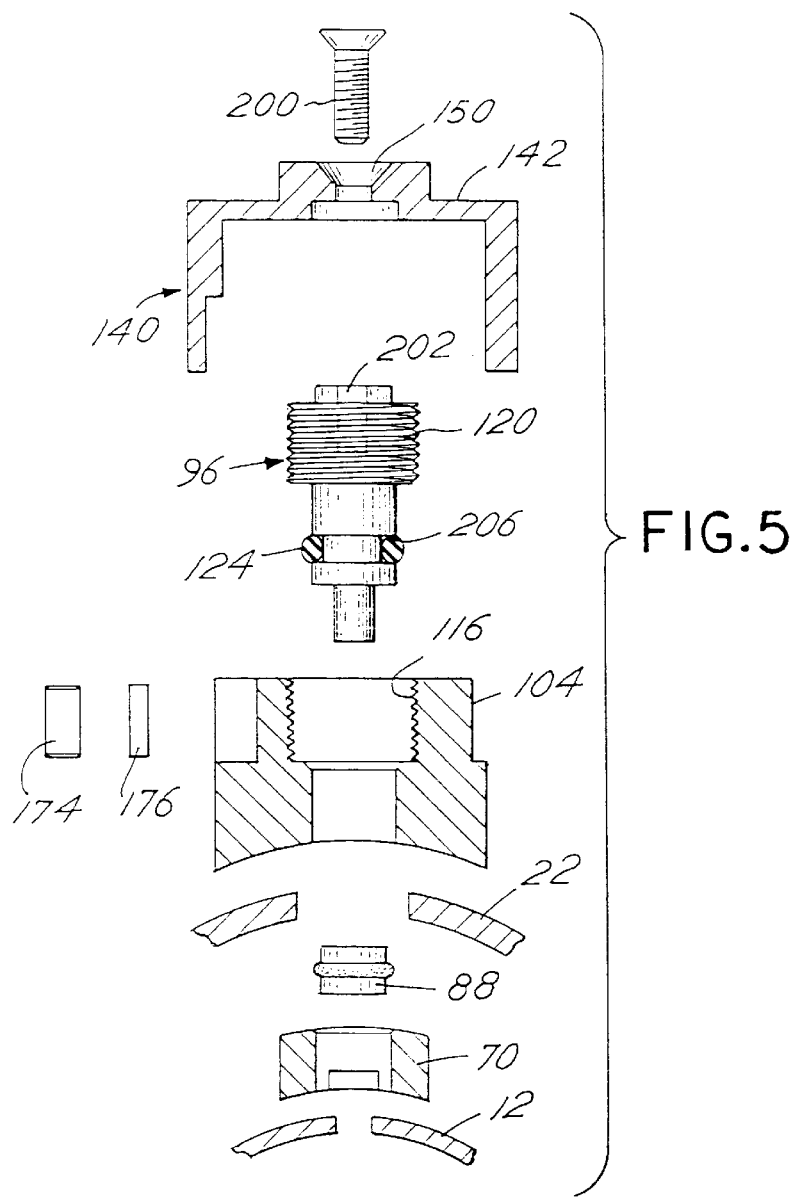
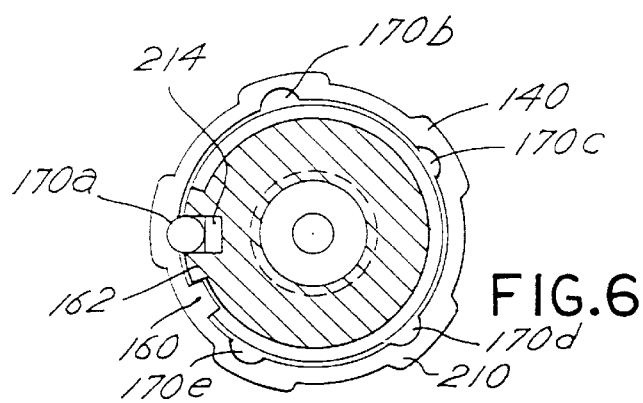

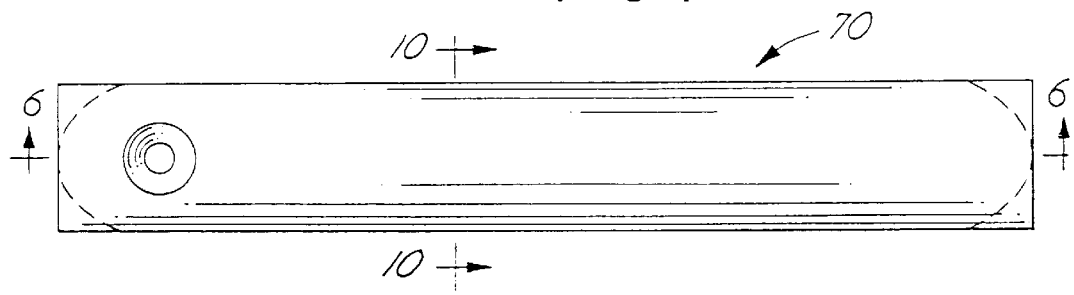
FIG.7
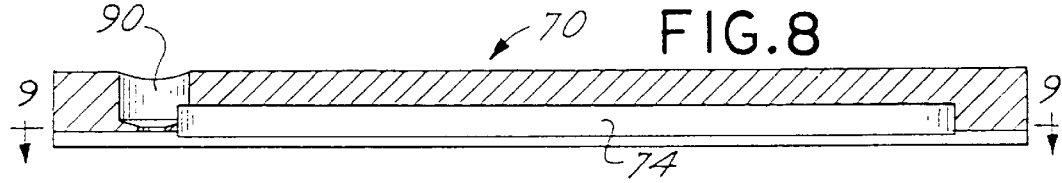
FIG.8
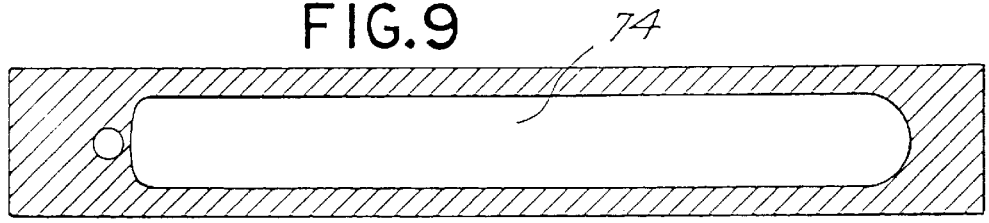
FIG.9
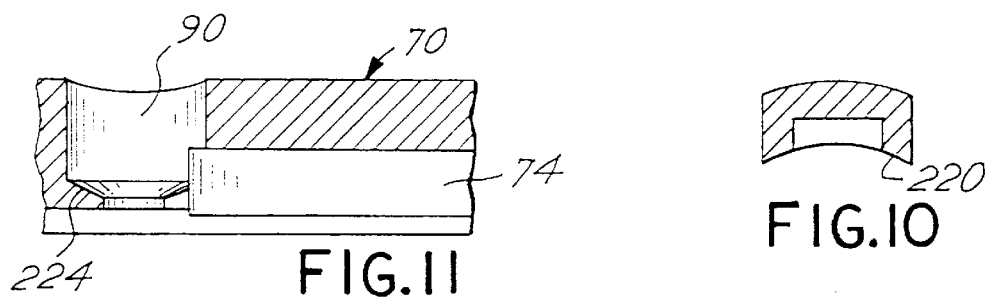
FIG.10
FIG.11
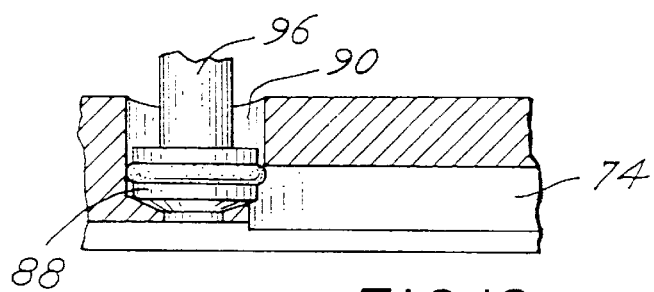
FIG.12

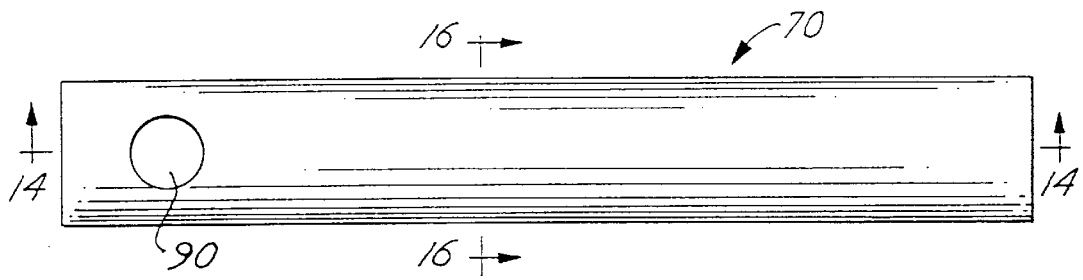
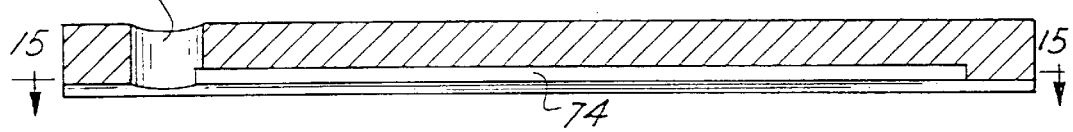
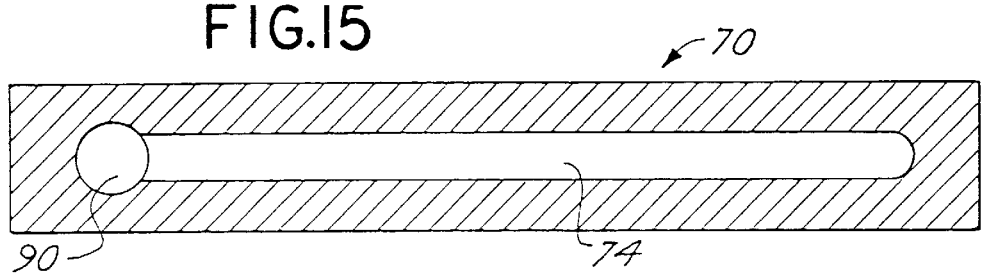
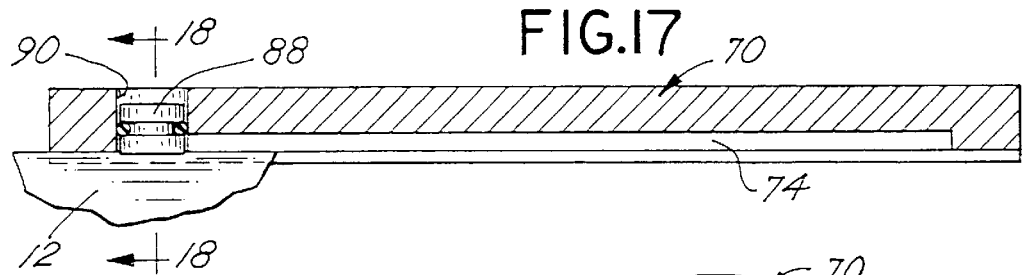
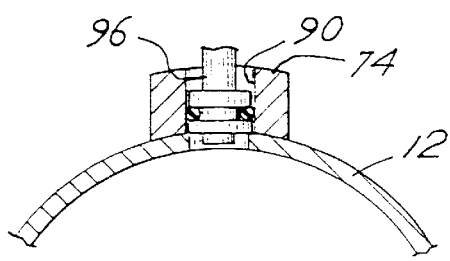

EXTERNALLY ADJUSTABLE DAMPENING CONTROL FOR A SHOCK ABSORBER

This is a continuation of application Ser. No. 08/746,760, filed Nov. 15, 1996 now abandoned; which is a continuation of Ser. No. 08/332,943, filed Oct. 31, 1994, now abandoned.

FIELD OF THE INVENTION

The present invention relates to hydraulic shock absorbers, and more particularly to a shock absorber of the double-acting tubular type having an apparatus for adjusting the dampening characteristics of the shock absorber over a portion of the shock absorber's range of motion. The shock absorber is especially useful on vehicles such as automobiles.

BACKGROUND OF THE INVENTION

Dual-acting shock absorbers utilized on vehicles usually consists of a hollow cylinder defining an internal chamber which is divided into a compression compartment and an expansion compartment by a piston slidably positioned in the internal chamber. The piston includes internal valving which permits fluid to flow between the compression and rebound compartments as the piston moves within the internal chamber.

A closed end of the cylinder is connected to the unsprung mass of the vehicle by a suitable linkage. A piston rod extends through a seal assembly mounted in the other end of the cylinder for movement relative to the cylinder. The piston rod has its inner end connected to the piston for movement therewith and its projecting and terminates in a linkage connectable to the sprung mass of the vehicle.

The damping characteristics of such shock absorbers are determined by the rate at which fluid is permitted to flow between the rebound and compression compartments. This rate, in turn, controls the speed at which the piston may move in the cylinder responsive to the external forces applied to the shock absorber.

Those working in the art have long recognized the desirability of being able to change or adjust the rate of fluid flow so that the damping characteristics of a shock absorber of this type may be changed to accommodate different, anticipated conditions. Adjustable damping shock absorbers have been proposed in the past and have included mechanisms for selectively changing the rate of fluid flow. These prior mechanisms share the disadvantages of requiring structurally complex individual components. The complexity is a result of the need to provide adjustment of the primary fluid flow path of the shock absorber, the inaccessibility of the location of the flow adjustment, and the need to provide for adjustment over a wide range of flows. This complexity results in relatively high fabrication or assembly costs.

Additionally in many of these prior mechanisms, adjustment of the flow rate requires the collapsing of the shock absorber and rotation of the piston against a retaining mechanism. Others require careful adjustment and securing of the mechanism. This need to so manipulate the shock absorber to adjust the damping characteristics has made these prior shock absorbers not only expensive but difficult to commercialize.

SUMMARY OF THE INVENTION

One or more of the above-noted problems are addressed by an externally adjustable dampening control according to present invention. The adjustable dampening control is designed for use with duel-acting shock absorbers of the type having a hollow cylinder defining an internal chamber which is divided into a compression compartment and a rebound compartment by a piston slidably mounted in the cylinder.

The adjustable dampening control includes a bypass for permitting fluid to bypass the piston when the piston is within a preselected region within the cylinder. A valve assembly is provided for adjustably controlling the rate of flow through the bypass. The bypass may include a valve body extending longitudinally along a portion of the hollow cylinder and defining a flow passage having first and second longitudinally spaced ports opening to the internal chamber. The adjustable dampening control provides the ability to adjust the hardness and softness of the ride in a region corresponding to the normal curb/ride height, and still give strong resistance, and hence control when the piston moves beyond this region.

Other objects and advantages of the invention will become apparent upon reading the following detailed description and appended claims, and upon reference to the accompanying drawings.

BRIEF DESCRIPTION OF THE DRAWINGS

FIG. 3 is a partial exploded cross-sectional view of the dampening control mechanism of FIG. 2.

FIG. 4 is an enlarged partial cross-sectional view taken along line 4—4 of FIG. 2.

FIG. 5 is an exploded cross-sectional view of an alternative embodiment of the dampening control mechanism.

FIG. 6 is an enlarged partial cross-sectional view the embodiment of FIG. 5, taken from the same perspective as FIG. 4.

FIG. 7 is a top view of a first embodiment of a valve body of the dampening control mechanism.

FIG. 8 is a cross-sectional view taken along line 8—8 of FIG. 7.

FIG. 9 is a cross-sectional view taken along line 9—9 of FIG. 8.

FIG. 10 is a cross-sectional view taken along line 10—10 of FIG. 7.

FIG. 11 is an enlarged partial cross-sectional view of FIG. 8.

FIG. 12 is a view similar to FIG. 11, showing the piston positioned in the transverse bore.

FIG. 13 is a top view of a second embodiment of the valve body of the dampening control mechanism.

FIG. 14 is a cross-sectional view taken along line 14—14 of FIG. 13.

FIG. 15 is a cross-sectional view taken along line 15—15 of FIG. 14.

FIG. 16 is a cross-sectional view taken along line 16—16 of FIG. 13.

FIG. 17 is an view similar to FIG. 14, showing placement of the inner cylinder and the piston.

FIG. 18 is a cross-sectional view along line 18—18 of FIG. 17.

DETAILED DESCRIPTION OF THE PREFERRED EMBODIMENTS

Figure 1:
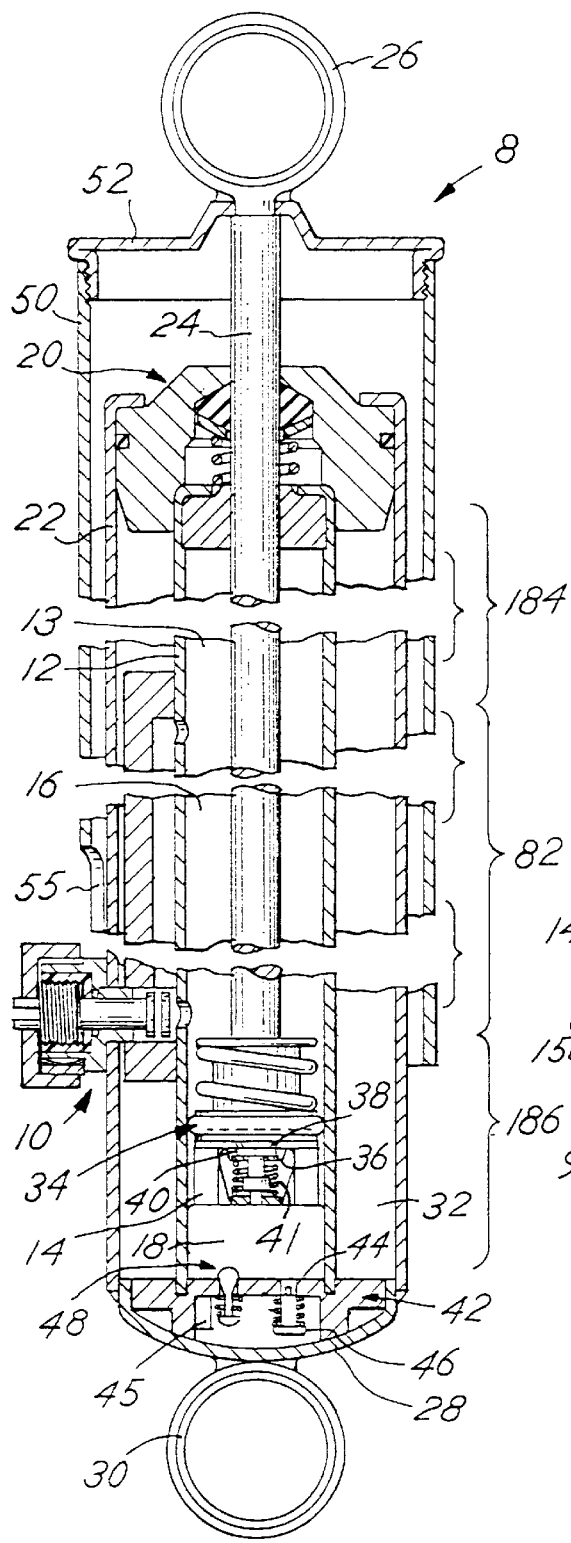
FIG. 1 is a cross-sectional view of a shock absorber embodying the principles of the present invention.

FIG. 1 shows a shock absorber 8 which incorporate the dampening control mechanism 10 according to the present invention. For illustration purposes the adjustable dampening control mechanism of the present invention has been illustrated in connection with a conventional shock absorber which is more fully described in U.S. Pat. No. 4,310,077, entitled "Shock Absorbers With Improved Compressible Cushions," the disclosure of which is hereby incorporated by reference. It will be appreciated, however, that the dampening control mechanism 10 of the present invention is readily adapted for use with numerous other shock absorbers, such as that described in U.S. Pat. No. 5,234,084, entitled "Shock Absorber," the disclosure of which is hereby incorporated by reference.

The shock absorber 8 is adapted to be connected between the sprung portion (i.e. the body) and unsprung portion (i.e., the front and rear suspension portions) of a vehicle to damp the relative movement of the sprung and unsprung portions. The shock absorber 8 includes an inner cylinder 12 which defines a cylindrical chamber 13. A piston assembly 14 slidably mounted within the chamber 13 divides the chamber 13 into an upper rebound compartment 16 and a lower compression compartment 18, the volumes of which vary in accordance with the position of the piston assembly 14. The end of the shock 8 adjacent the rebound compartment 16 is sometimes referred to as the open end or rod end, whereas the end adjacent the compression compartment 18 is commonly referred to as the closed end.

The upper end of the inner cylinder member 12 has an end closure assembly 20 fixed thereto. The end closure assembly 20 also receives the upper end of an intermediate cylinder 22. The end closure assembly 20 serves to slidably and sealingly engage the outer diameter of a piston rod 24 which extends into the rebound chamber 16 and is suitably connected with the piston assembly 14. The outer end of the piston rod 24 has an appropriate connector 26 fixed thereon which serves to connect the shock absorber 10 to the sprung portion of the vehicle.

An end cap or closure 28 is fixed to the lower end of the intermediate cylinder 22. A connector 30 in turn fixed to the central exterior of the end cap 28 for connecting the lower end of the shock absorber 10 with the unsprung portion of the vehicle.

It will be understood that the rebound and compression chambers 16, 18 are filled with hydraulic fluid which also partially fills a replenishing space 32 formed between the outer diameter of the inner cylinder 12 and the inner diameter of the intermediate cylinder 22. In order to control the flow of hydraulic fluid from the compression chamber 18 into the rebound compartment 16 during the compression movement of the shock absorber 10, the piston 14 includes a spring pressed piston compression valve mechanism, generally indicated at 34. The compression valve mechanism 34 is constructed in accordance with the teachings contained in the U.S. Pat. No. 4,310,077.

The piston 14 also defines a downwardly facing annular valve seat 36 which is disposed intermediate the opposite ends of the piston in surrounding relation to a central passage 38. A rebound valve 40 is disposed in cooperating relation with the valve seat 36. The valve 40 is resiliently urged into engagement with the seat 36 by a coil spring 41.

In order to accommodate the piston rod 24 displacement of fluid during the telescopic movements of the shock absorber 10, there is provided a base assembly 42 which is positioned adjacent the lower end closure 28. The base assembly 42 includes a base member 44 which is fixedly connected with the lower end of the inner cylinder 22 and resides within the interior volume of the end closure 28. The periphery of the base member 44 provides passages 45 between the replenishing space 32 and the space between the base member 44 and end closure 28. Mounted within the base member 44 is a compression valve assembly 46 and a replenishing valve 48.

As shown, the shock absorber 10 also includes an outer cylinder 50 defining a dust cover which surrounds the intermediate cylinder 22. The outer cylinder 50 is fixedly connected at its upper end to the juncture between the piston rod 24 and connector 26 by an annular member 52, for example. The dust cover includes a slot 55 to accommodate a portion of the adjustable dampening control mechanism 10 when the shock absorber 8 is compressed.

Figure 2:
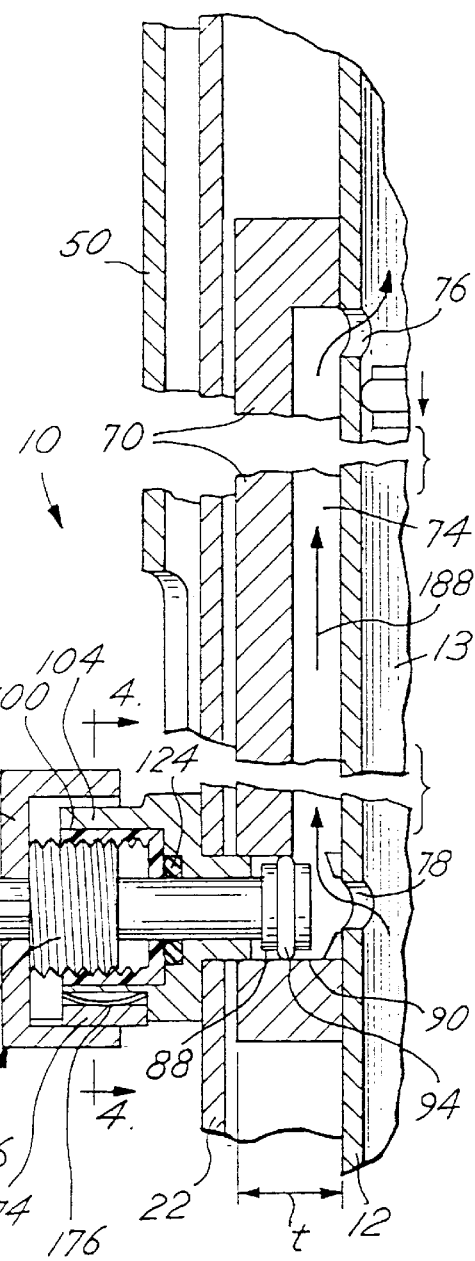
FIG. 2 is an enlarged partial cross-sectional view of a dampening control mechanism according to the present invention.

As can best be seen in FIGS. 2 and 3, the adjustable dampening control mechanism 10 includes a valve body 70 extending longitudinally along the outer diameter of the inner cylinder 12. The valve body 70 is of a thickness such that it fits in the space between the inner cylinder 12 and the intermediate cylinder 22. The valve body 70 is made from sintered iron or other like material and may be attached to the inner cylinder 12 by brazing, for example.

The valve body 70 defines a bypass flow passage 74 extending between a pair of longitudinally spaced flow ports 76, 78 opening to the internal chamber 13. The flow passage 74 permits fluid to bypass the piston assembly 14 when the piston assembly 14 is in an intermediate region 82 (see FIG. 1) of the chamber 13. The intermediate region 82, as defined by the longitudinal space between the flow ports 76, 78, is positioned along the chamber 13 to correspond to the curb or ride height of the chock absorber when the shock absorber is mounted on a vehicle.

A valve assembly 86 is provided for controllably restricting the flow passage 74 to control the rate of fluid flow through the passage 74. The valve assembly 86 includes a piston 88 which is slidably mounted in a transverse bore 90 formed in the outer wall of the valve body 70. A raised flange 94 formed in the outer diameter of the piston as forms a close, free sliding fit with the inner diameter of the transverse bore 90. Alternatively, the piston 88 may carry an O-ring in its outer diameter. The transverse bore 90 interacts the flow passage 74 so that the piston 88 can slide into the flow passage 74 to restrict fluid flow therethrough. Although the transverse bore 90 is illustrated as being generally axial with the lower flow port 78. It could readily be positioned at other locations along the valve body 74.

The valve assembly 86 also includes an adjustment rod 96, a threaded insert 100, and a collar 104 which are adapted to control the position of the piston 88 within the transverse bore 90. The collar 104 is mounted on the outer diameter of the intermediate cylinder 22 and includes a circular flange 106 extending from its inner face. The flange 106 extends through a reciprocal bore 110 in the intermediate cylinder 22 and into the transverse bore 90. The outer diameter of the flange 106 is sized to form a close fit with the transverse bore 90. The collar 104 may be made from a metal such as sintered iron and may be connected to the outer diameter of the intermediate cylinder 22 by brazing for example.

The collar 104 includes a central bore 114 which extends axially with the transverse bore 90. The central bore 114 includes an increased diameter portion 116 configured to receive the threaded insert 100. The increased diameter portion 116 of the central bore 114 and the outer diameter of the insert 100 are preferably non-circular so as to prevent rotation of the insert relative to the collar. For example, the increased diameter portion 116 of the bore 114 and the outer diameter of the insert 100 may be hexagonal as shown in FIG. 4. The insert 100 may be made from nylon and may be further affixed to within the collar 104 by a suitable adhesive such as Loctite 494 Superbonder.

The adjustment rod 96 includes a threaded portion 120 which threadably engages reciprocal threads formed in the inner diameter of the insert. The inner end of the adjustment rod 96 extends through the central bore 114 of the collar 104 and into the transverse bore 90. An O-ring 124 is mounted in a recess 128 formed at the junction of the insert 100 and the collar 104. The inner diameter of the O-ring 124 forms a close fit with the outer diameter of the adjustment rod 96 to prevent fluid from leaking out of the transverse bore 90.

The piston 88 is fixedly mounted on a reduced diameter portion 132 of inner end of the adjustment rod 96. The piston 88 and the adjustment rod 96 may both be made of nylon, in which case the piston 88 may be attached to the rod 96 by an adhesive such as Loctite 494 Superbonder and/or by press fitting. Rotation of the adjustment rod 96 in the threaded insert 100 moves the rod 96, and hence the piston 88, along the transverse bore 90. Specifically, clockwise rotation of the adjustment rod 96 moves the piston 88 inwardly in the transverse bore 90, whereas counter-clockwise rotation of the adjustment rod 96 moves the piston 88 outwardly in the transverse bore 90. As the piston 88 moves into the transverse bore 90 it increasingly restricts the flow passage 74, thereby decreasing the volume of fluid which can by-pass the piston assembly 14.

A knob 140 is fixedly connected to the adjustment rod 96 for rotating the rod 96 relative to the collar 104 and the insert 100. The knob 140 includes a top face 142 and a side wall 146 extending from the periphery of the top face 142. A reduced diameter portion 150 in the outer end of the adjustment rod 96 extends through a reciprocal aperture 152 formed in the top face 142 of the knob 140. The knob 140 may be formed of nylon, in which case it may be bonded to the adjustment rod 96 by an adhesive, such as Loctite 494 Superbonder, and/or by press fitting. A slot 156 formed in the reduced diameter portion 150 of the rod 96 is accessible through the circular aperture 152 to allow the position of the piston 88 to be adjusted during final assembly of the shock absorber 8.

As can best be seen in FIG. 4, a rectangular protrusion 160 extending from the inner diameter of the sidewall 146 is adapted to engage a reciprocal rectangular protrusion 162 formed in the outer diameter of the collar 104. The protrusions 160, 162 prevent the adjustment rod 96 from being screwed out of the collar 104 after the shock absorber 8 has been assembled. The protrusions 160, 162 also limit total rotation of the rod 96 to a predetermined range which in the illustrated embodiment is approximately 300 degrees.

The collar 104 carries a detent mechanism 166 which is adapted to releasably engage slots 170 formed in the inner diameter of the sidewall 146, thereby releasably locking the position of the knob 140, and hence the rod 96, relative to the collar 104. In the illustrated embodiment there are 5 slots 170a–170e equally spaced at 75 degree intervals about the inner diameter of the knob 140. As will be appreciated, the first slot 170a corresponds to the softest ride, whereas the fifth slot 170e corresponds to the "hardest" ride. The knob 140 may include reference marking (not shown) for indicating the relative hardness of each setting.

The detent mechanism 166 includes a pin 174 mounted in a slot 178 formed in the outer diameter of the collar 104. A spring 176, such as a metallic leaf spring (as shown), is positioned in the slot 178 to bias the pin 174 outwardly against the inner diameter of the sidewall 146. When the pin 174 is not aligned with one of the slots 170, the sidewall 146 presses the pin 174 into the slot 178, compressing the leaf spring 176. When the pin 174 aligns with one of the slots 170 in the inner diameter of the knob 140, the spring 176 biases the pin 174 outwardly and into the slot 170. As will be apparent, the detent mechanism 166 could be carried by the knob 140 and the slots 170 could be positioned on the collar 104.

As can be seen from the above description, the adjustable dampening control mechanism 10 provides the ability to adjust the hardness and softness of the ride near the normal curb/ride height, and still give strong resistance, and hence control, when the piston assembly 14 moves beyond the intermediate region 82. Specifically, when the piston assembly 14 is in the upper or lower regions 184, 186 (see FIG. 1) of the chamber 13, resistance to piston movement is determined solely by the valving in the piston assembly 14 and the base assembly 42. However, when the piston assembly 14 is in the intermediate region 82, fluid flows through the flow passage 74, bypassing the piston assembly 14. During the compression stroke, i.e., when the piston assembly 14 is moving towards the compression compartment 18, the increasing pressure in the compression compartment 18 forces fluid through the flow passage 74 and into the rebound compartment 16 as indicated by the arrow 188 in FIG. 2. Conversely, when the piston assembly 14 moves towards the rebound compartment 16, fluid flows in the opposite direction of the arrow 188. Resistance to piston movement through the intermediate region 82 can be adjusted by rotating the knob 140 to move the piston 88 within the transverse bore 90, thereby adjusting the amount of fluid that flows through the bypass flow passage 74.

FIGS. 5–6 show a second embodiment for the valve assembly 86. The first and second embodiments are very similar, and hence, on the major differences between the two embodiments will be highlighted. A first difference is the manner in which the knob 140 is connected to the adjustment rod 96. In the second embodiment a fastener 200, such as a screw, extends through the aperture 150 in the top face 142 of the knob 140 and into a reciprocal aperture 202 formed in the end of the adjusting rod 96. The aperture 202 may be threaded, or, in the alternative, the fastener 200 may be a self-taping screw. Adhesive may be used in addition to the fastener 200 to further secure the knob 140 to the rod.

A second difference is that the threaded insert 100 has been eliminated in the second embodiment. The primary reason for using the threaded insert 100 is to reduce wear on the threaded portion of the adjusting rod 96. In some applications, however, it may be desirable to eliminate the insert to reduce cost and/or increase manufacturability. In the second embodiment, the increased diameter portion 116 of the center bore 114 is circular and presents threads adapted to threadably engage the threaded portion 120 of the adjustment rod 96. In addition, a groove 206 is formed about the periphery of the adjusting rod 96 for carrying the O-ring 124.

Another difference between the first and second embodiments is the shape of the outer diameter of the knob 140. As can best be seen in FIG. 6, raised protrusions 210 are formed in the outer diameter of the knob 140, in proximity to the slots 170. These raised protrusions 210 assist in gripping the knob 140 and may also serve as a reference index for indicating the dampening setting of the shock absorber 10. The second embodiment also illustrates the use of an elastomeric member 214 in place of the leaf spring 176. The elastomeric member 214 is compressible to allow the pin 176 to slide into the slot 178 in the outer diameter of the collar 104.

FIGS. 7–12 show a first embodiment of the valve body 70. Although the valve body 70 is generally rectangular, it can take other shapes without departing from the scope of the claims. For example, the ends of the valve body 70 may be rounded, as illustrated with broken lines in FIG. 7. As can best be seen in FIG. 10, the bottom surface 220 of the valve body 70 is arcuate to conform to the outer diameter of the inner cylinder 12. The valve body 70 is made of a metal, such as sintered iron, and may be connected to the outer diameter of the inner cylinder by brazing, for example. The bottom of the transverse bore as is beveled to form a valve seat 224 for the piston 88. (See FIGS. 11 and 12).

FIGS. 13–18 illustrate a second embodiment for the valve body 70. The primary difference between first and second embodiments is that no valve seat is provided in the second embodiment. Instead, the transverse bore 90 extend completely through the valve body 70. In this embodiment, a valve seat may be milled about the flow port 78, in the outer diameter of the inner cylinder 12. FIG. 15 also illustrates that the size of the flow passage 74 can be varied to provide the desired amount of bypass fluid flow.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A shock absorber comprising:
   a) a first hollow cylinder defining an internal chamber having an open end and a closed end;
   b) a piston rod received in sealed relation to the cylinder at the open end of the cylinder and being movable toward and away from the closed end of the cylinder;
   c) a piston affixed to the piston rod within the internal chamber and separating the internal chamber into a compression compartment adjacent the closed end of the cylinder and a rebound compartment adjacent the open end of the cylinder, the volumes of the compartments varying in accordance with the position of the piston in the cylinder, the piston including valve means for permitting controlled fluid flow between the compression and rebound compartments;
   d) a valve body extending longitudinally along an intermediate region of the outer diameter of the hollow cylinder and defining a flow passage having first and second longitudinally spaced ports opening to the internal chamber, the space between the first longitudinally spaced port and the open end of the cylinder defining an upper region of the internal chamber, the space between the second longitudinally spaced port and the closed end of the cylinder defining a lower region of the internal chamber, and space between the first and second longitudinal spaced ports defining the intermediate region of the internal chamber which corresponds to the curb height of the shock absorber when the shock absorber is mounted on a vehicle; and
   e) valve means for adjustably controlling the rate of flow through the flow passage; and
   f) wherein the flow passage permits fluid to bypass the piston when the piston is in the intermediate region, but not when it is either of the upper and lower regions.

2. A shock absorber as set forth in claim 1, wherein:
   a) the valve body further includes a transverse bore intersecting the flow passage; and
   b) the valve means includes:
      i) a second piston slidably movable in the transverse bore for adjustably restricting the flow passage; and
      ii) adjustment means for controllably adjusting the position of the second piston within the transverse bore to control the rate of fluid flow passage.

3. A shock absorber as set forth in claim 2, wherein the adjustment means comprises:
   a) a collar positioned adjacent the valve body and defining a central bore extending axially with the transverse bore; and
   b) an adjustment rod threadably engaging the central bore, the adjustment rod having an inner end extending into the transverse bore and being connected to the second piston for moving the second piston within the transverse bore.

4. A shock absorber as set forth in claim 3, further comprising a knob connected to the adjustment rod to permit the rod to be threaded into and out of the collar.

5. A shock absorber as set forth in claim 4, further comprising a detent mechanism adapted to releasably lock the position of the knob relative to the collar.

6. A shock absorber as set forth in claim 1, wherein:
   a) the valve body further includes a transverse bore intersecting the flow passage; and
   b) the valve means includes:
      i) a second piston slidably movable in the transverse bore for adjustably restricting the flow passage; and
      ii) adjustment means for controllably adjusting the position of the second piston within the transverse bore to control the rate of fluid flow passage.

7. A shock absorber comprising:
   a) a first hollow cylinder defining an internal chamber having an open end and a closed end;
   b) a piston rod received in sealed relation to the cylinder at the open end of the cylinder and being movable toward and away from the closed end of the cylinder;
   c) a piston affixed to the piston rod within the internal chamber and separating the internal chamber into a compression compartment adjacent the closed end of the cylinder and a rebound compartment adjacent the open end of the cylinder, the volumes of the compartments varying in accordance with the position of the piston in the cylinder, the piston including valve means for permitting controlled fluid flow between the compression and rebound compartments;
   d) a valve body extending longitudinally along an intermediate region of the outer diameter of the hollow cylinder and defining a flow passage having first and second longitudinally spaced ports opening to the internal chamber, the flow passage permitting fluid to bypass the piston only when the piston is in the intermediate region, the intermediate region corresponding to the curb height of the shock absorber when the shock absorber is mounted on a vehicle, the valve body further including a transverse bore intersecting the flow passage;
   e) a valve adapted to adjustably control the rate of flow through the flow passage, the valve comprising:
      i) a second piston slidably movable in the transverse bore for adjustably restricting the flow passage; and
      ii) adjustment means for controllably adjusting the position of the second piston within the transverse bore to control the rate of fluid flow passage;

f) a second hollow cylinder outwardly spaced from the first hollow cylinder and defining a fluid reservoir between the first and second cylinders; and g) a second valve adapted to permit fluid flow between the compression compartment and the fluid reservoir.

8. A shock absorber as set forth in claim 7, wherein the valve body is physically positioned in the fluid reservoir.

9. A shock absorber comprising:

a) a first hollow cylinder defining an internal chamber having an open end and a closed end;

b) a piston rod received in sealed relation to the cylinder at the open end of the cylinder and being movable toward and away from the closed end of the cylinder;

c) a piston affixed to the piston rod within the internal chamber and separating the internal chamber into a compression compartment adjacent the closed end of the cylinder and a rebound compartment adjacent the open end of the cylinder, the volumes of the compartments varying in accordance with the position of the piston in the cylinder, the piston including valve means for permitting controlled fluid flow between the compression and rebound compartments;

d) a valve body extending longitudinally along an intermediate region of the outer diameter of the hollow cylinder and defining a flow passage having first and second longitudinally spaced ports opening to the internal chamber, the flow passage permitting fluid to bypass the piston only when the piston is in the intermediate region, the intermediate region corresponding to the curb height of the shock absorber when the shock absorber is mounted on a vehicle, the valve body further including a transverse bore intersecting the flow passage;

e) valve means for adjustably controlling the rate of flow through the flow passage, the valve means comprising i) a second piston slidably movable in the transverse bore for adjustably restricting the flow passage; and ii) adjustment means for controllably adjusting the position of the second piston within the transverse bore to control the rate of fluid flow passage;

f) a second hollow cylinder outwardly spaced from the first hollow cylinder and defining a fluid reservoir between the first and second cylinders;

g) second valve means for permitting fluid flow between the compression compartment and the fluid reservoir; and h) wherein the adjustment means comprises:

i) a collar positioned on the outer diameter of the second cylinder, adjacent the valve body, the collar including a flange extending through the second cylinder and into the transverse bore, the collar defining a central bore extending axially with and opening into the transverse bore; and ii) an adjustment rod threadably engaging the central bore, the adjustment rod having an inner end extending into the transverse bore and being connected to the second piston for moving the second piston within the transverse bore.

10. A shock absorber as set forth in claim 9, further comprising a knob connected to the adjustment rod to permit the rod to be threaded into and out of the collar.

11. A shock absorber as set forth in claim 10, further comprising a detent mechanism adapted to releasably lock the position of the knob relative to the collar.

\* \* \* \* \*